United States Patent [19]
Mozer

[11] 3,821,349
[45] June 28, 1974

[54] INTERNAL COOLING OF POLYETHYLENE TEREPHTHALATE TUBING

[75] Inventor: Larry P. Mozer, Bartlesville, Okla.

[73] Assignee: Phillips Petroleum Company, Bartlesville, Okla.

[22] Filed: June 15, 1972

[21] Appl. No.: 263,223

[52] U.S. Cl. ............... 264/209, 264/90, 264/99, 264/237, 425/71, 425/DIG. 208
[51] Int. Cl. .............. B29c 17/07, B29d 23/04
[58] Field of Search ............ 264/89, 90, 92–99, 264/209, 237, 348; 425/71, 326, 387, 392, DIG. 208

[56] References Cited
UNITED STATES PATENTS

| | | | |
|---|---|---|---|
| 2,814,071 | 11/1957 | Allan et al. | 264/95 X |
| 3,057,013 | 10/1962 | Loveless | 425/71 X |
| 3,169,272 | 2/1965 | Maxson | 264/209 X |
| 3,182,103 | 5/1965 | Blaylock, Jr. et al. | 264/209 X |
| 3,231,642 | 1/1966 | Goldman et al. | 264/95 |
| 3,248,463 | 4/1966 | Wiley et al. | 264/95 |
| 3,290,198 | 12/1966 | Lux et al. | 264/209 X |
| 3,390,426 | 7/1968 | Turner et al. | 264/99 UX |
| 3,470,282 | 9/1969 | Scalora | 264/97 |
| 3,496,143 | 2/1970 | Siggel et al. | 264/92 X |
| 3,546,745 | 12/1970 | Ball | 425/71 |

*Primary Examiner*—Jan H. Silbaugh

[57] ABSTRACT

Relatively heavy wall, clear polyethylene terephthalate tubing is prepared by extruding a tubular melt into contact with an external sizing and cooling surface while simultaneously cooling the inner surfaces by means of a mandrel within the tubing spaced apart from the inner walls thereof by a narrow annular gap. Upon exiting from the sizing sleeve, the tubing is passed through a water bath. The cooled tubing can be severed into open ended parison preforms and such preforms reheated and blow molded.

7 Claims, 3 Drawing Figures

PATENTED JUN 28 1974  3,821,349

INTERNAL COOLING OF POLYETHYLENE TEREPHTHALATE TUBING

BACKGROUND OF THE INVENTION

This invention relates to forming relatively heavy wall, clear polyethylene terephthalate tubing.

Polyethylene terephthalate is a commercially available resin which has long been of substantial economic importance in many end uses. While it can be quenched and oriented to form clear films, its normal appearance in relatively thick sections is white and opaque. Because of the tendency of this material to be opaque in thick sections, it has heretofore seemed not to be feasible to produce bottles by means of preformed parisons. Because of the low melt strength, it has further not seemed feasible to produce bottles by conventional melt extrusion of a parison into position between the mold halves. Netherlands Pat. application No. 70/18,361 opened for inspection June 21, 1971, does disclose making bottles from polyethylene terephthalate but requires an unusual machine which extrudes an already preformed parison simultaneous with the introduction of fluid pressure.

SUMMARY OF THE INVENTION

It is an object of this invention to provide relatively thick wall clear tubing of polyethylene terephthalate; and it is yet a further object of this invention to make possible the economical production of clear biaxially oriented polyethylene terephthalate bottles.

In accordance with this invention polyethylene terephthalate is extruded into a tube which contacts an external cooling and sizing sleeve, while simultaneously being cooled from the interior by means of a cooled mandrel concentric with said tubing and spaced apart from the inner wall thereof by a narrow annular gap.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figure 1:
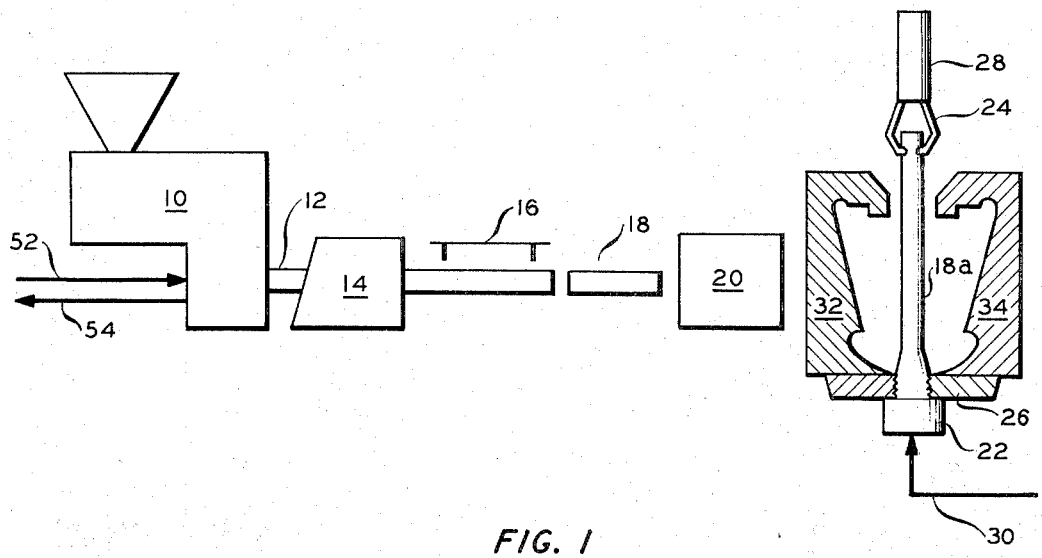
FIG. 1 is a schematic representation of apparatus for forming tubing in accordance with the invention.

The instant invention is applicable to formation of tubing of polyethylene terephthalate. Particularly suitable polymer is that having an inherent viscosity as measured by ASTM D-2857 except using a 60:40 mixture of phenoltetrachloroethane as solvent of from 0.4 to 1.2, preferably 0.55 to 0.99.

The polymer can be extruded from the melt into the shape of a tube by any conventional apparatus. It is preferred to carry out the extrusion at a melt temperature within the range of 500° to 580° F, preferably 510° to 570°. At temperatures below about 540°, some haze can begin to occur in the polymer although this is related to the specific thickness being formed and other variables. Above 570° F, some bubbles may occur although temperatures as high as 590° F can be utilized. While the invention can be utilized in the formation of tubing of any thickness, the problem with the tubing being opaque is present to a much lesser extent in tubing having a wall thickness of 75 to 90 mils. Above these thicknesses conventional extrusion of the polymer results in a white coloration varying from translucent to completely opaque. Thus, the invention is of particular applicability in producing tubing having a wall thickness of greater than 90 mils, preferably 90 to 160, more preferably 115 to 140 mils.

It has been found that if the relatively thick wall tubing is formed in this manner and severed into individual open end parisons, these parisons, if fabricated in a certain manner, can form clear biaxially oriented bottles. Specifically, the parisons must be reheated relatively rapidly to orientation temperature, grasped at each end, stretched longitudinally, and expanded into conformity with a mold. This can be done by heating in an air oven at a temperature of 240° to 370° F, preferably 250° to 300° F. The parisons must be held at this temperature for a time of 7 minutes or less, preferably 1 to 4, more preferably 2 to 3. Particularly desirable results are obtained using heating temperatures of 240° to 290° F and times of 2 to 6 minutes. Parisons formed from tubing made in accordance with this invention having good clarity initially, and on rapid reheating and forming as noted hereinabove produce clear high strength articles. If the tubing made in accordance with the invention is reheated slowly, the resulting blow molded article will have high haze or else the parison cannot be fabricated at all.

Referring now to the drawings, particularly FIG. 1, there is shown an extruder 10 for forming a tubular extrudate 12. Molten tubular extrudate 12 passes immediately into vacuum cooling and sizing chamber 14 as shown in greater detail in FIG. 2. The solidified tubular extrudate then passes from sizing chamber 14 to cutting means 16 where it is severed into individual open end parison preforms 18. Parison preforms 18 pass through air oven 20 where they are heated to orientation temperature. They are then transferred to thread forming head 22 by gripping fingers 24. Relative movement is then effected between the thread-forming head 22 having jaw means 26 and end gripping fingers 24 by means of either raising gripping fingers through the action of cylinder 28 which serves as a means to effect relative axial movement, to the position shown in FIG. 1, or else by means of lowering head 22 to stretch the parison into the elongated condition depicted by reference character 18a. Preblow fluid and main blow fluid are introduced via line 30. Mold halves 32 and 34 then close on the thus-stretched parison, sealing and severing same at the upper end thereof.

Figure 2:
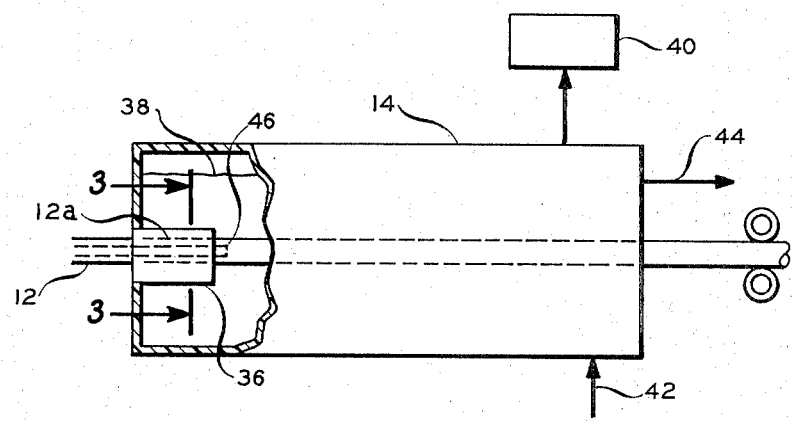
FIG. 2 is a detailed view of a cooling and sizing chamber of FIG. 1.

Referring now to FIG. 2, there is shown in greater detail the vacuum cooling and sizing chamber of FIG. 1. The extrudate 12 initially enters a cooling and sizing sleeve 36 which can be identical to that shown in Ball, U.S. Pat. No. 3,546,745, the disclosure of which is hereby incorporated by reference. On emerging from cooling and sizing sleeve 36, the thus-cooled extrudate passes into the water in tank 14, the level of which is represented by reference character 38. Vacuum means 40 is shown for providing reduced pressure within tank 14. Coolant water is shown entering via line 42 and being removed via line 44. While the specific chamber shown in FIG. 2 is the preferred cooling and sizing means to be employed in the process of the invention, it is not essential that the chamber be under a vacuum. Also, it is within the scope of the invention to utilize some other cooling fluid other than water. It is desirable that the coolant temperature be relatively low. Water with sufficient ice to maintain the temperature at about 40° F is satisfactory. Preferably, the temperature of the coolant is within the range of 20° to 60° F, more preferably 33° to 60° so as to allow the use of water without any freezing point depressant. The sizing sleeve 36 is preferably as shown in the Ball patent referred to hereinabove, although it is also within the scope of the invention to utilize a sleeve having a solid inner surface where there is no contact with the cooling fluid until the tubing exits from the sleeve.

Figure 3:
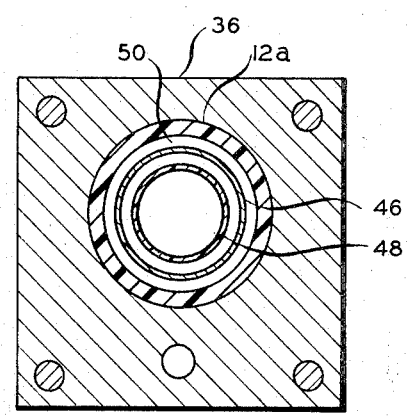
FIG. 3 is a sectional view of the cooling sleeve of FIG. 1 showing the internal cooling mandrel.

Referring now to FIG. 3, there is shown a view along section lines 3—3 of FIG. 2 so as to view the internal cooling mandrel which is essential to the operation of the invention. The cooling mandrel simply comprises two concentric tubes 46 and 48 with outer tube 46 being closed at the end thereof and tube 48 terminating just short of the end of tubing 46 so the cooling fluid can flow through tube 48, out the end thereof, and back along the annulus between the two tubes thus cooling tube 46 which is concentric with tubing 12a and separated therefrom by a narrow annular gap 50. For best heat transfer it is preferred to construct tube 46 from such metals as aluminum, brass, beryllium/—copper, etc. It is essential to the invention that tubing 46 does not touch the inner surface of the extruded tubing 12a. However, the gap 50 can be as small as it is feasible to machine the parts so as to insure no contact. Satisfactory operation is obtained with gaps of 10 to 25 mils, for instance. Any other suitable mandrel could be utilized so long as it is kept cool enough to absorb substantial amounts of radiant heat from the freshly extruded tubing 12a. Generally, tubing 46 extends the length of the sizing sleeve 36 plus extending on beyond a distance of 10 inches or so during operations. For start-up it is generally retracted. Cooling water enters tube 48 via line 52 and exits via line 54 (see FIG. 1). Cooling fluid for mandrel 46 can be identical to that within chamber 14, and the same temperature preference is applied.

The length of the cooling and sizing sleeve can vary depending on the speed of extrusion and other conditions. A suitable length is 5 to 20, preferably about 10 times the outside diameter of the tubing being extruded.

Many conventional parts have been omitted from the drawings for the sake of simplicity but their inclusion is understood by those skilled in the art and is within the scope of the invention.

EXAMPLE

A commercially available polyethylene terephthalate sold under the trademark Arnite A–200 by American Enka Corporation was extruded into tubing utilizing a barrel temperature of 530° to 550° F, a neck temperature of 550° F, body temperature of 550° F and a die temperature of 550° F. The resulting tubing was passed directly into a cooling chamber such as shown in FIGS. 2 and 3 having a cooled centrally disposed mandrel concentric with the sizing sleeve. Water at a temperature of 55° to 60° F was circulated through the mandrel. Water of 55° to 60° F was also present in the bath and was circulated through the sizing sleeve. The gap between the outer surface of the sizing sleeve and the inner surface of the extrudate was about 10 mils. The resulting tubing had an outside diameter of 0.920 to 0.926 with a wall thickness of 0.124 inch. It possessed excellent clarity. The resulting tubing was cut into 7 inch lengths and reheated in an oven at 300° for about 2-½ minutes. Thereafter, the parisons were grasped at each end, stretched axially approximately 100 percent, and mold halves closed thereon to seal and sever one end. Internal fluid pressure was introduced to give a 10 oz. round bottle having excellent clarity and high impact strength. Other bottles were made utilizing heating times to 7 minutes and oven temperatures of 240° to 300° F with similar results.

CONTROL

Identical polymer to that of the Example was extruded in an identical extruder under essentially identical conditions, specifically an extruder temperature of 520° to 535° F, neck temperature of 535° F, body temperature of 550° F, and die temperature of 530° F. Tubing having an outside diameter of 0.920–0.960 inch and a wall thickness of 0.124 inch was produced. The tubing was cooled using a sizing sleeve identical to that of the Example except without the internal cooling mandrel. The resulting tubing had a glossy interior and exterior but was completely opaque. It was not possible to produce clear bottles from this opaque tubing utilizing the technique utilized in the Example.

While this invention has been described in detail for the purposes of illustration, it is not to be construed as limited thereby but is intended to cover all changes and modifications within the spirit and scope thereof.

I claim:

1. A method of forming clear thick walled polyethylene terephthalate tubing comprising forming a molten tubular extrudate of said polyethylene terephthalate at a melt temperature of from 500° to 590° F and solidifying said thus-formed extrudate to form tubing by cooling said extrudate from the outside by passing it into direct contact with an external sizing sleeve having fluid at 20° to 60° F circulated there through while simultaneously cooling said extrudate from the inside by passing it axially over an internal cooling mandrel having fluid at 20° to 60° F circulated there through, which cooling mandrel is concentric with said extrudate, the external surface of said cooling mandrel being separated from an inner surface of said extrudate by a narrow annular gap having a finite dimension of no more than 25 mils, said cooled tubing having a wall thickness of greater than 90 mils.

2. A method according to claim 1 wherein said polymer is extruded at a melt temperature of 500° to 580° F.

3. A method according to claim 1 wherein said tubing on exiting from said sizing sleeve is passed through a water bath.

4. A method according to claim 3 wherein said external sizing sleeve is cooled with water at a temperature of 33° to 60° F, said mandrel is cooled with water at a temperature of 33° to 60° F, and said water bath is at a temperature of 33° to 60° F.

5. A method according to claim 3 wherein said melt temperature is within the range of 510° to 570° F.

6. A method according to claim 3 wherein said annular gap is within the range of 10 to 25 mils.

7. A method according to claim 3 wherein said tubing has a wall thickness within the range of 115 to 140 mils.

* * * * *